3,515,535
HERBICIDAL COMPOSITION
Gordon Lindsey, 2124 Cortez,
West Covina, Calif. 91790
No Drawing. Filed Apr. 11, 1966, Ser. No. 541,487
Int. Cl. A01n 5/00
U.S. Cl. 71—65                                    6 Claims

ABSTRACT OF THE DISCLOSURE

A herbicidal composition consisting essentially of from about 2% to about 60% by weight of ammonium thiosulfate and from about 10% to about 15% by weight of a surfactant and a solvent therefor is applied to weeds, particularly those of the Euphorbiacease or spurge family.

This invention relates to a novel herbicidal composition and the method of applying the same to undesired vegetation. More particularly, the invention concerns a selective herbicide containing ammonium thiosulfate as its active ingredient.

The use of sodium-ammonium thiosulfate to treat seed potatoes prior to planting, either as a dust or in solution, is disclosed in U.S. Pat. No. 1,803,157, but there is no suggestion or teaching that ammonium thiosulfate possesses herbicidal properties.

In accordance with the present invention, it was found thta ammonium thiosulfate, $(NH_4)_2S_2O_3$, exhibits a high degree of selective herbicidal activity toward certain weeds, particularly those of the Euphorbiacease family, and also those of the genus Oxalis, and of the genus Trifolium or clover. Among such weeds, those belonging to the Euphorbiacease or spurge family of plants, which includes the spurges, the cascarilla, croton-oil, castor-oil, and cassava, have heretofore been very difficult to eradicate.

The ammonium thiosulfate, which is preferably applied as a spray, destroys the weeds to which it is applied by absorption through the foliage or the root system. Thus, when it is applied in the form of a spray, the ammonium thiosulfate is absorbed by the plant leaves, thence migrating to the root system.

Applied in the form of a spray, in accordance with the invention, the ammonium thiosulfate, which is a crystalline solid, odorless and nonvolatile, is dissolved in a suitable solvent, such as water in a herbicidal concentration. This concentration will generally range from about 2% to about 5% by weight of the solution but may be as high as 60% by weight. If desirable for special applications, a water-miscible organic solvent, such as methanol, ethanol or acetone, may also be employed.

Further, in accordance with the invention, there is incorporated in the ammonium thiosulfate solution a suitable surfactant or wetting agent, to impart good spreading properties and to assure good contact of the spray with the leaves and foliage of the treated vegetation. The amount of the wetting agent may range between about 10% and 15% by weight of the solution, preferably about 12%. Examples of types of surfactants which may be employed include fatty alcohol sulfates, alkyl aryl sulfonates, salts of alkylated benzene sulfonic acids, lignosulfonic acids, polyoxyethylated alcohols or amines, long chain quaternary ammonium compounds, and sodium salts of petroleum sulfonic acids.

The ammonium thiosulfate herbicidal preparations of the invention are relatively inexpensive to use and are noncorrosive to metal equipment. They have the further advantage of not sterilizing the soil, and indeed of imparting to treated areas both nitrogen and sulfur fertilizer values.

The herbicidal method of the invention comprises applying ammonium thiosulfate as a spray to the area to be protected from undesirable plant growth in sufficient amount to exert the desired herbicidal action. The application may be made directly upon the infested area and the vegetation thereon during the period of infestation. Alternatively, the application can be made in advance of an anticipated infestation, i.e. in pre-emergence stages.

Infested areas which are advantageously treated with the herbicidal compositions of the invention include commercial crops, trees and nursery stock, ornametnal trees and shrubs, floral acreage, and established lawns. Thus, the ammonium thiosulfate spray is particularly valuable for treating spurge infested dichondra and blade grass lawns.

The following examples illustrate the preparation of the herbicidal compositions of the invention and the practice of applying them to infested areas, but are not to be regarded as limiting.

Example 1

A herbicidal spray suitable for application to lawns is prepared by dissolving a mixture of 7 parts by weight of ammonium thiosulfate and 1 part by weight of wetting agent in water at the rate of 4 ounces of the mixture per 1 gallon of water. The resulting solution is applied by a pressure-type sprayer to the foliage of spurge infestation. One gallon of spray is sufficient to treat 100 square feet of infested area. The spray kills spurge or defoliates Oxalis, with no damage to the lawn grasses or dichondra. The ingredients may also be dissolved separately as well as in admixture.

Example 2

Plots of about 200 square feet in area infested with spurge, were divided into two equal portions, one of which was treated with the composition described in Example 1, and the other allowed to remain untreated. The spray was applied to the treated area at the rate of 1 gallon per 100 square feet. In 24 hours, severe injury to the weed was noted. In about 72 hours, the spurge was definitely dead.

What is claimed is:
1. A herbicidal composition consisting essentially of from about 2% to about 60% by weight of ammonium thiosulfate, from about 10% to about 15% by weight of a surfactant, and an aqueous solvent therefor.
2. Method of selectively destroying undesirable vegetation in an infested area which comprises applying to an infested area a herbicidal amount of ammonium thiosulfate.
3. The method of claim 2 in which the ammonium thiosulfate is applied in the form of an aqueous solution containing a herbicidal concentration thereof.
4. The method of claim 3 in which said aqueous solution contains a surfactant.
5. The method of claim 3 in which the concentration of ammonium thiosulfate is between about 2% and about 5% by weight.

6. The method of claim 2 in which the vegetation to be treated is a member of the spurge family.

References Cited

UNITED STATES PATENTS

| 1,625,608 | 4/1927 | Holmes | 71—65 |
| 1,803,157 | 4/1931 | Wesenberg et al. | 71—65 X |
| 1,913,141 | 6/1933 | Offord et al. | 71—65 |
| 1,997,750 | 4/1935 | Sauchelli | 71—65 |

OTHER REFERENCES

Freas, Chemical Fungicides and Plant Insecticides, vol. II, p. 50 (1948).

Federal Register 30, 9002, 7/1965.

JAMES O. THOMAS, Jr., Primary Examiner

U.S. Cl. X.R.

71—69

UNITED STATES PATENT OFFICE
CERTIFICATE OF CORRECTION

Patent No. 3,515,535    Dated June 2, 1970

Inventor(s) Gordon Lindsey

It is certified that error appears in the above-identified patent and that said Letters Patent are hereby corrected as shown below:

Column 2, cancel lines 51 through 54 comprising claim 1. In the heading to the printed specification, line 7, "6 Claims" should read -- 5 Claims --.

Signed and sealed this 14th day of July 1970.

(SEAL)
Attest:

EDWARD M. FLETCHER, JR.
Attesting Officer

WILLIAM E. SCHUYLER, JR.
Commissioner of Patents